United States Patent
Dutta et al.

(10) Patent No.: US 7,738,882 B2
(45) Date of Patent: Jun. 15, 2010

(54) FRAMEWORK OF MEDIA-INDEPENDENT PRE-AUTHENTICATION IMPROVEMENTS: INCLUDING CONSIDERATIONS FOR FAILED SWITCHING AND SWITCHBACK

(75) Inventors: Ashutosh Dutta, Bridgewater, NJ (US); Victor Fajardo, Robbinsville, NJ (US); Yoshihiro Oba, Englewood Cliffs, NJ (US); Kenichi Taniuchi, Jersey City, NJ (US)

(73) Assignees: Toshiba America Research, Inc., Piscataway; Telcordia Technologies, Inc., Piscataway ( * ) Notice: Subject to any disclaimer, the term of this patent is extended or adjusted under 35 U.S.C. 154(b) by 343 days.

(21) Appl. No.: 11/279,856

(22) Filed: Apr. 14, 2006

(65) Prior Publication Data
US 2007/0047491 A1 Mar. 1, 2007

Related U.S. Application Data

(60) Provisional application No. 60/698,949, filed on Jul. 14, 2005.

(51) Int. Cl.
*H04W 24/00* (2009.01)
(52) U.S. Cl. ............... 455/456.1; 456/436; 456/437; 456/438; 456/439; 456/440; 456/441; 456/442; 456/443; 456/444
(58) Field of Classification Search ......... 455/436–444, 455/456.1
See application file for complete search history.

(56) References Cited

U.S. PATENT DOCUMENTS 6,711,408 B1* 3/2004 Raith ..................... 455/440
6,879,830 B1 4/2005 Vollmer et al.
2005/0102529 A1* 5/2005 Buddhikot et al. ........... 713/200
2005/0197136 A1* 9/2005 Friday et al. .............. 455/456.1
2006/0052113 A1* 3/2006 Ophir et al. ............... 455/456.1
2006/0121916 A1* 6/2006 Aborn et al. .............. 455/456.5
2008/0048856 A1* 2/2008 Culpepper et al. ...... 340/539.13

FOREIGN PATENT DOCUMENTS

| JP | 2003-284117 | 10/2003 |
|---|---|---|
| JP | 2004-7576 | 1/2004 |
| JP | 2007-511147 | 4/2007 |
| WO | 01/58182 A2 | 8/2001 |
| WO | 0158182 A2 | 8/2001 |

OTHER PUBLICATIONS

P. Jayaraman, Pana Framework, Jul. 11, 2005, p. 1-30, Internet Draft, USA.
A. Dutta, Media-Independent Pre-Authentication Implementation Results, Jul. 2005, p. 1-16, Internet Draft, USA.
S. Bradner, Key Words for Use in RFC's to Indicate Requirement Levels, Mar. 1997, p. 1-3, USA.
D. Forsberg, Pana Mobility Optimizations, Jan. 17, 2005, p. 1-13, Internet Draft, USA.

(Continued)

*Primary Examiner*—Nick Corsaro
*Assistant Examiner*—Amanuel Lebassi
(74) *Attorney, Agent, or Firm*—Watchstone P&D, PLLC

(57) ABSTRACT

The preferred embodiments herein relate to methods and systems for controlling a handoff decision related to switch back of a mobile node between a first network and a second network in a media independent pre-authentication framework and/or to methods and systems for mitigating effects of undesired switch back of a mobile node between a first network and a second network in a media independent pre-authentication framework.

24 Claims, 4 Drawing Sheets

OTHER PUBLICATIONS

J. Bournelle, Use of Context Transfer Protocol for Pana, Jun. 24, 2005, p. 1-19, Internet Draft, USA.

J. Loughney, Context Transfer Protocol, Aug. 2004, p. 1-33, Internet Draft, USA.

Teerapabkajorndet W., et al., Comparison of Performance of Location-Aware and Traditional Handoff-Decision Algorithms in CDPD Networks, VTC Fall 2001. IEEE 54th. Vehicular Technology Conference, Proceedings, Atlantic City, N.J., Oct. 2001 (pp. 212-216).

Teerapabkajorndet, Throughput Consideration for Location-Aware Handoff in Mobile Data Networks, The 13th IEEE International Symposium, Sep. 2002 (pp. 223-2227).

Kyriazakos, et al., Optimization of the Handover Algorithm Based on the Position of the Mobile Terminals, I.E.E.E. Symposium, Oct. 2000 (pp. 155-159).

Kang, et al., Resource Remain Type for Drop or Ping Pong Call Recovery, I.E.E.E. Internet Citation, listed as Mar. 2004.

Chen, et al., Active Application Oriented Vertical Handover in Next-Generation Wireless Netowrks, I.E.E.E. Communications and, Mar. 2005 (pp. 1383-1388).

Japanese Office Action in JP 2007-536412.

International Search Report in PCT/JP2006/314312.

* cited by examiner

Figure 1: Basic Communication Flow (1/2)

Figure 2: Basic Communication Flow (2/2)

Figure 3: Bootstrapping Link-layer Security

FRAMEWORK OF MEDIA-INDEPENDENT PRE-AUTHENTICATION IMPROVEMENTS: INCLUDING CONSIDERATIONS FOR FAILED SWITCHING AND SWITCHBACK

The present application claims priority under 35 U.S.C. 119 to U.S. Provisional Application Ser. No. 60/698,949 filed on Jul. 14, 2005, the entire contents of which are incorporated herein by reference. In addition, the present application incorporates by reference the entire disclosures of each of the following U.S. Provisional Patent Applications: 1) Ser. No. 60/625,106, filed on Nov. 5, 2004, entitled Network Discovery Mechanism For Secure Fast Handoff; 2) Ser. No. 60/593,377, filed on Jan. 9, 2005, entitled Network Discovery Mechanisms; 3) Ser. No. 60/670,655, filed on Apr. 13, 2005, entitled Network Discovery Mechanisms; and 4) Ser. No. 60/697,589, filed on Jul. 11, 2005, entitled RDF Schema Update for 802.1 Baseline Document; 5) U.S. Provisional Patent Application No. 60/649,554 filed Feb. 4, 2005, entitled A Framework Of Media-Independent Pre-Authentication; and 6) U.S. Provisional Application Ser. No. 60/595,169 filed on Jun. 13, 2005. In addition, the entire disclosure of the following co-pending Utility U.S. patent application is incorporated herein by reference: U.S. patent application Ser. No. 10/761,243 entitled Mobility Architecture Using Pre-Authentication, Pre-Configuration and/or Virtual Soft-Handoff, filed on Jan. 22, 2004.

BACKGROUND

Field of the Invention

The present application relates to, inter alia, methods for pre-authentication, including, e.g., methods for media independent pre-authentication and the like.

BACKGROUND DISCUSSION

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3 G cellular devices, 2.5 G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

FIG. 4 depicts some illustrative architectural components that can be employed in some illustrative and non-limiting implementations including wireless access points to which client devices communicate. In this regard, FIG. 4 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22.

In some of the preferred embodiments described herein, systems and methods are described to proactively establish higher layer and lower layer contexts of different media. Here, media includes, e.g., the available networks accessible to mobile devices (e.g., wired, wireless licensed, wireless unlicensed, etc.). See, e.g., media discussed in I.E.E.E. 802, including I.E.E.E. 802.21. Media may include, e.g., wireless LAN (e.g., I.E.E.E. 802.11), I.E.E.E. 802.16, I.E.E.E. 802.20, Bluetooth, etc. Some illustrative examples include: 1) a mobile device switching from a cellular network to a wireless or WIFI network, such as, e.g., a cell phone with cellular interface and wireless interface trying to get WIFI access by obtaining information (e.g., keys, etc.) initially over the cellular network, rather than simultaneously establishing a wireless interface; 2) where a mobile device currently has wireless or WIFI connectivity, where the wireless LAN may potentially shut down quickly or the like, in which case, by way of example, the mobile device can proactively do pre-authentication via cellular network (i.e., so as to enable a quick switch if needed). In some illustrative cases, a mobile node with a single IEEE 802.xx interface may roam among multiple subnets and multiple administrative domains. While keeping multiple interfaces always-on is an option, a mobile node may want to deactivate unused interfaces in some instances (such as, e.g., to save power, etc.). In addition, MPA can provide, among other things, secure and seamless mobility optimization that works for inter-subnet handoff, inter-domain handoff, inter-technology handoff, etc., as well as the use of multiple interfaces.

PANA:

For reference, information related to PANA from P. Jayaraman, "PANA Framework," Internet-Draft, draft-ietf-pana-framework-01.txt, work in progress, July 2004 is incorporated herein in this section. In this regard, PANA is a link-layer agnostic network access authentication protocol that runs between a node that wants to gain access to the network and a server on the network side. PANA defines a new EAP [see B. Aboba, et al, "Extensible Authentication Protocol (EAP)," RFC 3748, June 2004] lower layer that uses IP between the protocol end points. Id.

The motivation to define such a protocol and the requirements are described in Yegin, A. and Y. Ohba, *Protocol for Carrying Authentication for Network Access* (PANA) *Requirements*, draft-ietf-pana-requirements-08 (work in progress), June 2004. Protocol details are documented in Forsberg, D., Ohba, Y., Patil, B., Tschofenig, H. and A. Yegin, *Protocol for Carrying Authentication for Network Access* (PANA), draft-ietf-pana-pana-04 (work in progress), May 2004. Parthasarathy, M., *PANA Enabling IPsec Based Access Control*, draft-ieff-pana-ipsec-03 (work in progress), May 2004.describes the use of IPsec for access control following PANA-based authentication. IPsec can be used for per-packet access control, but nevertheless it is not the only way to achieve this functionality. Alternatives include reliance on physical security and link-layer ciphering. Separation of PANA server from the entity enforcing the access control has been envisaged as an optional deployment choice. SNMP [see Mghazli, Y., Ohba, Y. and J. Bournelle, *SNMP Usage for PAA-2-EP Interface*, draft-ietf-pana-snmp-00 (work in progress), April 2004 has been chosen as the protocol to carry associated information between the separate nodes. Id.

PANA design provides support for various types of deployments. Access networks can differ based on the availability of lower-layer security, placement of PANA entities, choice of client IP configuration and authentication methods, etc. Id.

PANA can be used in any access network regardless of the underlying security. For example, the network might be physically secured, or secured by means of cryptographic mechanisms after the successful client-network authentication. Id.

The PANA client, PANA authentication agent, authentication server, and enforcement point have been functional entities in this design. PANA authentication agent and enforcement point(s) can be placed on various elements in the access network (such as, e.g., access point, access router, dedicated host). Id.

IP address configuration mechanisms vary as well. Static configuration, DHCP, stateless address auto-configuration are possible mechanisms to choose from. If the client configures an IPsec tunnel for enabling per-packet security, configuring IP addresses inside the tunnel becomes relevant, for which there are additional choices such as IKE. Id.

PANA protocol is designed to facilitate authentication and authorization of clients in access networks. PANA is an EAP [see Aboba, B., Blunk, L., Vollbrecht, J., Carlson, J. and H. Levkowetz, *Extensible Authentication Protocol (EAP)*, RFC 3748, June 2004, lower-layer that carries EAP authentication methods encapsulated inside EAP between a client host and an agent in the access network. While PANA enables the authentication process between the two entities, it is only a part of an overall AAA and access control framework. An AAA and access control framework using PANA includes four functional entities, as discussed below and as schematically depicted in FIGS. 1(A) to 1(C). Id.

A first functional entity is a PANA Client (PaC) is the client implementation of the PANA protocol. This entity resides on the end host that is requesting network access. The end hosts can include, for example, laptops, PDAs, cell phones, desktop PCs and/or the like that are connected to a network via a wired or wireless interface. A PaC is responsible for requesting network access and engaging in the authentication process using the PANA protocol. Id.

A second functional entity is a PANA Authentication Agent (PAA) is the server implementation of the PANA protocol. A PAA is in charge of interfacing with the PaCs for authenticating and authorizing them for the network access service. The PAA consults an authentication server in order to verify the credentials and rights of a PaC. If the authentication server resides on the same host as the PAA, an application program interface (API) is sufficient for this interaction. When they are separated (a more common case in public access networks), a protocol is used to run between the two. LDAP [see Hodges, J. and R. Morgan, *Lightweight Directory Access Protocol (v3): Technical Specification*, RFC 3377, September 2002] and AAA protocols like RADIUS [see Rigney, C., Willens, S., Rubens, A. and W. Simpson, *Remote Authentication Dial In User Service (RADIUS)*, RFC 2865, June 2000] and Diameter [see Calhoun, P., Loughney, J., Guttman, E., Zorn, G. and J. Arkko, *Diameter Base Protocol*, RFC 3588, September 2003] are commonly used for this purpose. Id.

The PAA is also responsible for updating the access control state (i.e., filters) depending on the creation and deletion of the authorization state. The PAA communicates the updated state to the enforcement points in the network. If the PAA and EP are residing on the same host, an API is sufficient for this communication. Otherwise, a protocol is used to carry the authorized client attributes from the PAA to the EP. While not prohibiting other protocols, currently SNMP [see Mghazli, Y., Ohba, Y. and J. Bournelle, *SNMP Usaqe for PAA-2-EP Interface*, draft-ietf-pana-snmp-00 (work in progress), April 2004, has been suggested for this task. Id.

The PAA resides on a node that is typically called a Network Access Server (NAS) in the local area network. The PAA can be hosted on any IP-enabled node on the same IP subnet as the PaC. For example, on a BAS (broadband access server) in DSL networks, or PDSN in 3GPP2 networks. Id.

A third functional entity is an Authentication Server (AS), which is the server implementation that is in charge of verifying the credentials of a PaC that is requesting the network access service. The AS receives requests from the PAA on behalf of the PaCs, and responds with the result of verification together with the authorization parameters (e.g., allowed bandwidth, IP configuration, etc). The AS might be hosted on the same host as the PAA, on a dedicated host on the access network, or on a central server somewhere on the Internet. Id.

A fourth functional entity is an Enforcement Point (EP), which is the access control implementation that is in charge of allowing access to authorized clients while preventing access by others. An EP learns the attributes of the authorized clients from the PAA. The EP uses non-cryptographic or cryptographic filters to selectively allow and discard data packets. These filters may be applied at the link-layer or the IP-layer. When cryptographic access control is used, a secure association protocol needs to run between the PaC and EP. Link or network layer protection (for example, TKIP, IPsec ESP) is used after the secure association protocol established the necessary security association to enable integrity protection, data origin authentication, replay protection and optionally confidentiality protection. An EP should be located strategically in a local area network to minimize the access of unauthorized clients to the network. For example, the EP can be hosted on a switch that is directly connected to clients in a wired network. That way, the EP can drop unauthorized packets before they reach any other client host or beyond the local area network. Id.

Some of the entities may be co-located depending on the deployment scenario. For example, the PAA and EP could be on the same node (BAS) in DSL networks. In that case, a simple API is sufficient between the PAA and EP. In small enterprise deployments, the PAA and AS may be hosted on the same node (e.g., access router) that eliminates the need for a protocol run between the two. The decision to co-locate these entities or otherwise, and their precise location in the network topology are deployment decisions. Id.

Use of IKE or 4-way handshake protocols for secure association has been only required in the absence of any lower-layer security prior to running PANA. Physically secured networks (such as, e.g., DSL) or networks that are already cryptographically secured on the link-layer prior to PANA run (e.g., cdma2000) do not require additional secure association and per-packet ciphering. These networks can bind the PANA authentication and authorization to the lower-layer secure channel that is already available. Id.

The EP on the access network allows general data traffic from any authorized PaC, whereas it allows only limited type of traffic (e.g., PANA, DHCP, router discovery) for the unauthorized PaCs. This ensures that the newly attached clients have the minimum access service to engage in PANA and get authorized for the unlimited service. Id.

The PaC needs to configure an IP address prior to running PANA. After a successful PANA authentication, depending on the deployment scenario, the PaC may need to re-configure its IP address or configure additional IP address(es). The additional address configuration may be executed as part of the secure association protocol run. Id.

An initially unauthorized PaC starts the PANA authentication by discovering the PAA on the access network, followed by the EAP exchange over PANA. The PAA interacts with the AS during this process. Upon receiving the authentication and authorization result from the AS, the PAA informs the PaC about the result of its network access request. Id.

If the PaC is authorized to gain the access to the network, the PAA also sends the PaC-specific attributes (e.g., IP address, cryptographic keys, etc.) to the EP by using SNMP. The EP uses this information to alter its filters for allowing data traffic from and to the PaC to pass through. Id.

In case cryptographic access control needs to be enabled after the PANA authentication, a secure association protocol runs between the PaC and the EP. The PaC should already have the input parameters to this process as a result of the successful PANA exchange. Similarly, the EP should have obtained them from the PAA via SNMP. Secure association exchange produces the required security associations between the PaC and the EP to enable cryptographic data traffic protection. Per-packet cryptographic data traffic protection introduces additional per-packet overhead but the overhead exists only between the PaC and EP and will not affect communications beyond the EP. In this sense, it is important to place the EP as close to the edge of the network as possible. Id.

Finally data traffic can start flowing from and to the newly authorized PaC. Id.

INTRODUCTION TO THE PRESENT INVENTION

As wireless technologies including cellular and wireless LAN are popularly used, supporting terminal handovers across different types of access networks, such as, e.g., from a wireless LAN to CDMA or to GPRS is considered as a clear challenge. On the other hand, supporting terminal handovers between access networks of the same type is still more challenging, especially when the handovers are across IP subnets or administrative domains. To address those challenges, it is important to provide terminal mobility that is agnostic to link-layer technologies in an optimized and secure fashion without incurring unreasonable complexity. In this document, we discuss terminal mobility that provides seamless handovers with low-latency and low-loss. Seamless handovers are characterized in terms of performance requirements as described in the next section, captioned Performance Requirements, below.

The basic part of terminal mobility is accomplished by a mobility management protocol that maintains a binding between a locator and an identifier of a mobile terminal, where the binding is referred to as the mobility binding. The locator of the mobile node may dynamically change when there is a movement of the mobile terminal. The movement that causes a change of the locator may occur not only physically but also logically. A mobility management protocol may be defined at any layer. In the rest of this document, the term "mobility management protocol" refers to a mobility management protocol which operates at network layer or higher.

There are several mobility management protocols at different layers. Mobile IP [RFC3344] and Mobile IPv6 [RFC3775] are mobility management protocols that operate at network-layer. There are several ongoing activities in the IETF to define mobility management protocols at layers higher than network layer. For example, MOBIKE (IKEv2 Mobility and Multihoming) [I-D.ietf-mobike-design] is an extension to IKEv2 that provides the ability to deal with a change of an IP address of an IKEv2 end-point. HIP (the Host Identity Protocol) [I-D.ietf-hip-base] defines a new protocol layer between network layer and transport layer to provide terminal mobility in a way that is transparent to both network layer and transport layer. Also, SIP-Mobility is an extension to SIP to maintain the mobility binding of a SIP user agent [SIPMM].

While mobility management protocols maintain mobility bindings, using them solely in their current form is not sufficient to provide seamless handovers. An additional optimization mechanism that works in the visited network of the mobile terminal to prevent loss of outstanding packets transmitted while updating the mobility binding is needed to achieve seamless handovers. Such a mechanism is referred to as a mobility optimization mechanism. For example, mobility optimization mechanisms [I-D.ieff-mobileip-lowlatency-handoffs-v4] and [I-D.ietf-mipshop-fast-mipv6] are defined for Mobile IPv4 and Mobile IPv6, respectively, by allowing neighboring access routers to communicate and carry information about mobile terminals.

There are protocols that are considered as "helpers" of mobility optimization mechanisms. The CARD (Candidate Access Router Discovery Mechanism) protocol [I-D.ietf-seamoby-card-protocol] is designed to discover neighboring access routers. The CTP (Context Transfer Protocol) [I-D.ietf-seamoby-ctp] is designed to carry state that is associated with the services provided for the mobile terminal, or context, among access routers.

There are several issues in existing mobility optimization mechanisms. First, existing mobility optimization mechanisms are tightly coupled with specific mobility management protocols. For example, it is not possible to use mobility optimization mechanisms designed for Mobile IPv4 or Mobile IPv6 for MOBIKE. What is strongly desired is a single, unified mobility optimization mechanism that works with any mobility management protocol. Second, there is no existing mobility optimization mechanism that easily supports handovers across administrative domains without assuming a pre-established security association between administrative domains. A mobility optimization mechanism should work across administrative domains in a secure manner only based on a trust relationship between a mobile node and each administrative domain. Third, a mobility optimization mechanism needs to support not only multi-interface terminals where multiple simultaneous connectivity through multiple interfaces can be expected, but also single-interface terminals.

This document describes a framework of Media-independent Pre-Authentication (MPA), a new handover optimization mechanism that has a potential to address all those issues. MPA is a mobile-assisted, secure handover optimization scheme that works over any link-layer and with any mobility management protocol including Mobile IPv4, Mobile IPv6, MOBIKE, HIP, SIP mobility, etc. In MPA, the notion of IEEE 802.11i pre-authentication is extended to work at higher layer, with additional mechanisms to perform early acquisition of IP address from a network where the mobile terminal may move as well as proactive handover to the network while the mobile terminal is still attached to the current network. This document focuses on the MPA framework. In employing such a framework, the actual set of protocols for chosen for MPA and detailed operations can be implemented by those in the art based on this disclosure. The below-identified document [I-D.ohba-mobopts-mpa-implementation] provides one method that describes usage and interactions between existing protocols to accomplish MPA functionality.

Performance Requirements

In order to provide desirable quality of service for interactive VoIP and streaming traffic, one needs to limit the value of end-to-end delay, jitter and packet loss to a certain threshold level. ITU-T and ITU-E standards define the acceptable values for these parameters. For example, for one-way delay, ITU-T G.114 recommends 150 ms as the upper limit for most of the applications, and 400 ms as generally unacceptable delay. One way delay tolerance for video conferencing is in the range of 200 to 300 ms. Also if an out-of-order packet is received after a certain threshold it is considered lost. The below-listed references [RFC2679], [RFC2680] and [RFC2681] describe some of the measurement techniques for delay and jitter.

An end-to-end delay typically includes several components, such as network delay, operating system (OS) delay, CODEC delay and application delay. Network delay includes transmission delay, propagation delay, and queuing delay in the intermediate routers. Operating System related delay consists of scheduling behavior of the operating system in the sender and receiver. CODEC delay is generally caused due to packetization and depacketization at the sender and receiver end.

Application delay is mainly attributed to playout delay that helps compensate the delay variation within a network. End-to-end delay and jitter values can be adjusted using proper value of the playout buffer at the receiver end. In the case of, e.g., interactive VoIP traffic, end-to-end delay affects the jitter value and is an important issue to consider. During a mobile's frequent handover, transient traffic cannot reach the mobile and this contributes to the jitter as well.

If the end system has a playout buffer, then this jitter is subsumed by the playout buffer delay, but otherwise this adds to the delay for interactive traffic. Packet loss is typically caused by congestion, routing instability, link failure, lossy links such as wireless links. During a mobile's handover a mobile is subjected to packet loss because of its change in attachment to the network. Thus, for both streaming traffic and VoIP interactive traffic, packet loss will contribute to the service quality of the real-time application.

The number of packets lost is proportional to the delay during handover and rate of traffic the mobile is receiving. Lost packets contribute to congestion in case of TCP traffic because of re-transmission, but it does not add to any congestion in case of streaming traffic that is RTP/UDP based. Thus, it is essential to reduce the packet loss and effect of handover delay in any mobility management scheme. In the next section 2, captioned Existing Work Fast-Handover, we describe some of the fast-handover scheme that have tried to reduce the handover.

According to ETSI TR 101, reference [ETSI] below, a normal voice conversation can tolerate up to 2% packet loss. If a mobile is subjected to frequent handoff during a conversation, each handoff will contribute to packet loss for the period of handoff. Thus maximum loss during a conversation needs to be reduced to a level that is acceptable.

There is no clear threshold value for packet loss for streaming application, but it needs to be reduced as much as possible to provide better quality of service to a specific application.

Existing Work Fast-Handover

While basic mobility management protocols such as, e.g., Mobile IP (see reference [RFC3344] below), Mobile IPv6 (see reference [RFC3775] below), and SIP-Mobility (see reference [SIPMM] below) offer solutions to provide continuity to TCP and RTP traffic, these are not optimized to reduce the handover latency during mobile's frequent movement between subnets and domains. In general, these mobility management protocols suffer from handover delays incurred at several layers such as layer 2, layer 3 and application layer for updating the mobile's mobility binding.

There have been several optimization techniques that apply to currently mobility management schemes that try to reduce handover delay and packet loss during a mobile's movement between cells, subnet and domain. There are few micro-mobility management schemes (see, e.g., reference [CELLIP] and reference [HAWAII] below), and intra-domain mobility management schemes (such as, e.g., seen in references [IDMP] and [I-D.ietf-mobileip-reg-tunnel] below) that provide fast-handover by limiting the signaling updates within a domain. Fast Mobile IP protocols for IPv4 and IPv6 networks (see reference [I-D.ietf-mobileip-lowlatency-handoffs-v4] and [I-D.ietf-mipshop-fast-mipv6] below) provide fast-handover techniques that utilize mobility information made available by the link layer triggers. Yokota, et al. (see reference [YOKOTA] below) propose joint use of access point and dedicated MAC bridge to provide fast-handover without altering MIPv4 specification. MACD scheme (see reference

[MACD] below) reduces the delay due to MAC layer handoff by providing a cache-based algorithm.

Some of the mobility management schemes use dual interfaces, thus, providing make-before-break scenario (see reference [SUM] below). In a make-before-break situation communication usually continues with one interface, when the secondary interface is in the process of getting connected. The IEEE 802.21 working group is discussing these scenarios in details.

Providing fast-handover using a single interface needs more careful design techniques than for a client with multiple interfaces. Reference [SIPFAST] below provides an optimized handover scheme for SIP-based mobility management, where the transient traffic is forwarded from the old subnet to the new one by using an application layer forwarding scheme. Reference [MITH] below provides a fast handover scheme for a single interface case that uses mobile initiated tunneling between the old foreign agent and new foreign agent. The below reference [MITH] defines two types of handover schemes such as Pre-MIT and Post-MIT.

The proposed MPA scheme is in some regards generally similar in nature to MITH's predictive scheme where the mobile communicates with the foreign agent before actually moving to the new network. However, among other things, the proposed MPA scheme described in this document is not limited to MIP type mobility protocol only. In addition, this scheme takes care of movement between domains and performs pre-authentication in addition to proactive handover. Thus, the proposed scheme can, among other things, reduce the overall delay to close to link-layer handover delay.

Terminology

In this document, the following terminology is employed:

Mobility Binding:

A binding between a locator and an identifier of a mobile terminal.

Mobility Management Protocol (MMP):

A protocol that operates at network layer or higher to maintain a binding between a locator and an identifier of a mobile terminal.

Binding Update:

A procedure to update a mobility binding.

Media-independent Pre-Authentication Mobile Node (MN):

A mobile terminal of media-independent pre-authentication (MPA) which is a mobile-assisted, secure handover optimization scheme that works over any link-layer and with any mobility management protocol. An MPA mobile node is an IP node. In this document, the term "mobile node" or "MN" without a modifier refers to "MPA Mobile Node". An MPA mobile node usually has a functionality of a mobile node of a mobility management protocol as well.

Candidate Target Network (CTN):

A network to which the mobile may move in the near future.

Target Network (TN):

The network to which the mobile has decided to move. The target network is selected from one or more candidate target network.

Proactive Handover Tunnel (PHT):

A bidirectional IP tunnel that is established between the MPA mobile node and an access router of the candidate target network. In this document, the term "tunnel" without a modifier refers to "proactive handover tunnel".

Point of Attachment (PoA):

A link-layer device (e.g., a switch, an access point or a base station, etc.) that functions as a link-layer attachment point for the MPA mobile node to a network.

Care-of Address (CoA):

An IP address used by a mobility management protocol as a locator of the MPA mobile node.

MPA Framework

Illustrative and non-limiting aspects of the Media-independent Pre-Authentication (MPA) framework are discussed in the following sub-sections.

1. Overview

Media-independent Pre-Authentication (MPA) is a mobile-assisted, secure handover optimization scheme that works over any link-layer and with any mobility management protocol. With MPA, a mobile node is not only able to securely obtain an IP address and other configuration parameters for a candidate target network (CTN), but also able to send and receive IP packets using the obtained IP address before it actually attaches to the CTN. This makes it possible for the mobile node to complete the binding update of any mobility management protocol and use the new CoA before performing a handover at link-layer.

This functionality is provided by allowing a mobile node, which has a connectivity to the current network but is not yet attached to a CTN, to (i) establish a security association with the CTN to secure the subsequent protocol signaling, then (ii) securely execute a configuration protocol to obtain an IP address and other parameters from the CTN as well as a execute tunnel management protocol to establish a proactive handover tunnel (PHT) between the mobile node and an access router of the CTN, then (iii) send and receive IP packets, including signaling messages for binding update of a mobility management protocol (MMP) and data packets transmitted after completion of binding update, over the PHT using the obtained IP address as the tunnel inner address, and finally (iv) deleting or disabling the PHT immediately before attaching to the CTN when it becomes the target network and then re-assigning the inner address of the deleted or disabled tunnel to its physical interface immediately after the mobile node is attached to the target network through the interface. Instead of deleting or disabling the tunnel before attaching to the target network, the tunnel may be deleted or disabled immediately after being attached to the target network.

Especially, the third procedure makes it possible for the mobile to complete higher-layer handover before starting link-layer handover. This means that the mobile is able to send and receive data packets transmitted after completion of binding update over the tunnel, while it is still able to send and receive data packets transmitted before completion of binding update outside the tunnel.

In the above four basic procedures of MPA, the first procedure is referred to as "pre-authentication", the second procedure is referred to as "pre-configuration", the combination of the third and fourth procedures are referred to as "secure proactive handover". The security association established through pre-authentication is referred to as an "MPA-SA". As indicated above, the tunnel established through pre-configuration is referred to as a "proactive handover tunnel" (PHT).

2. Functional Elements

In the MPA framework, in preferred embodiments, the following functional elements reside in each CTN to communicate with a mobile node: an Authentication Agent (AA), a Configuration Agent (CA) and an Access Router (AR). Some or all of those elements can be placed in a single network device or in separate network devices.

An authentication agent is responsible for pre-authentication. An authentication protocol is executed between the mobile node and the authentication agent to establish an MPA-SA. The authentication protocol needs to be able to derive a key between the mobile node and the authentication agent and should be able to provide mutual authentication. The authentication protocol should be able to interact with a AAA protocol such as RADIUS and Diameter to carry authentication credentials to an appropriate authentication server in the AAA infrastructure. The derived key is used for further deriving keys used for protecting message exchanges used for pre-configuration and secure proactive handover. Other keys that are used for bootstrapping link-layer and/or network-layer ciphers may also be derived from the MPA-SA. A protocol that can carry EAP (see, e.g., Reference [RFC3748] below) would be suitable as an authentication protocol for MPA.

A configuration agent is responsible for one part of pre-configuration, namely securely executing a configuration protocol to securely deliver an IP address and other configuration parameters to the mobile node. The signaling messages of the configuration protocol needs to be protected using a key derived from the key corresponding to the MPA-SA.

An access router is a router that is responsible for the other part of pre-configuration, i.e., securely executing a tunnel management protocol to establish a proactive handover tunnel to the mobile node, and secure proactive handover using the proactive handover tunnel. The signaling messages of the configuration protocol needs to be protected using a key derived from the key corresponding to the MPA-SA. IP packets transmitted over the proactive handover tunnel should be protected using a key derived from the key corresponding to the MPA-SA.

3. Basic Communication Flow

Assume that the mobile node is already connected to a point of attachment, say oPoA (old point of attachment), and assigned a care-of address, say oCoA (old care-of address). The communication flow of MPA is described as follows. Throughout the communication flow, data packet loss should not occur except for the period during the switching procedure in Step 5, and it is the responsibility of link-layer handover to minimize packet loss during this period.

Step 1 (Pre-authentication Phase):

The mobile node finds a CTN through some discovery process and obtains the IP addresses, an authentication agent, a configuration agent and an access router in the CTN by some means. The mobile node performs pre-authentication with the authentication agent. If the pre-authentication is successful, an MPA-SA is created between the mobile node and the authentication agent. Two keys are derived from the MPA-SA, namely an MN-CA key and an MN-AR key, which are used to protect subsequent signaling messages of a configuration protocol and a tunnel management protocol, respectively. The MN-CA key and the MN-AR key are then securely delivered to the configuration agent and the access router, respectively.

Step 2 (Pre-configuration Phase):

The mobile node realizes that its point of attachment is likely to change from oPoA to a new one, say nPoA (new point of attachment). It then performs pre-configuration, with the configuration agent using the configuration protocol to obtain an IP address, say nCoA (new care-of address), and other configuration parameters from the CTN, and with the access router using the tunnel management protocol to establish a proactive handover tunnel. In the tunnel management protocol, the mobile node registers oCoA and nCoA as the tunnel outer address and the tunnel inner address, respectively. The signaling messages of the pre-configuration protocol are protected using the MN-CA key and the MN-AR key. When the configuration and the access router are co-located in the same device, the two protocols may be integrated into a single protocol like IKEv2. After completion of the tunnel establishment, the mobile node is able to communicate using both oCoA and nCoA by the end of Step 4.

Step 3 (Secure Proactive Handover Main Phase):

The mobile node decides to switch to the new point of attachment by some means. Before the mobile node switches to the new point of attachment, it starts secure proactive handover by executing binding update of a mobility management protocol and transmitting subsequent data traffic over the tunnel (main phase). In some cases, it may like to cache multiple nCOA addresses and perform simultaneous binding with the Correspondent Host (CH) or Home Agent (HA) (in, e.g., the Mobile IPv6 specification RFC3775, a mobile node will be assigned a care-of address (CoA) when it roams to a foreign network and the mobile node will inform its Home Agent (HA) and Correspondent Node (CN) about its new CoA through a binding update process).

Step 4 (Secure Proactive Handover Pre-switching Phase):

The mobile node completes binding update and becomes ready to switch to the new point of attachment point. The mobile may execute the tunnel management protocol to delete or disable the proactive handover tunnel and cache nCoA after deletion or disabling of the tunnel. The decision as to when the mobile node is ready to switch to the new point of attachment depends on handover policy.

Step 5 (Switching):

It is expected that a link-layer handover occurs in this step.

Step 6 (Secure Proactive Handover Post-switching Phase):

The mobile node executes the switching procedure. Upon successful completion of the switching procedure, the mobile node immediately restores the cached nCoA and assigns it to the physical interface attached to the new point of attachment. If the proactive handover tunnel was not deleted or disabled in Step 4, the tunnel is deleted or disabled as well. After this, direct transmission of data packets using nCoA is possible without using a proactive handover tunnel.

An access router is a router that is responsible for the other part of pre-configuration, i.e., securely executing a tunnel management protocol to establish a proactive handover tunnel to the mobile node, and secure proactive handover using the proactive handover tunnel. The signaling messages of the configuration protocol must be protected using a key derived from the key corresponding to the MPA-SA. IP packets transmitted over the proactive handover tunnel SHOULD be protected using a key derived from the key corresponding to the MPA-SA.

REFERENCES

The present invention provides a variety of advances and improvements over, among other things, the systems and methods described in the following references, the entire disclosures of which references are incorporated herein by reference.

1. Bradner, S., "The Internet Standards Process—Revision 3", BCP 9, RFC 2026, October 1996. Referred to herein as [RFC2026].

2. Bradner, S., "IETF Rights in Contributions", BCP 78, RFC 3978, March 2005. Referred to herein as [RFC3978].

3. Perkins, C., "IP Mobility Support for IPv4", RFC 3344, August 2002. Referred to herein as [RFC3344].

4. Aboba, B., Blunk, L., Vollbrecht, J., Carlson, J., and H. Levkowetz, "Extensible Authentication Protocol (EAP)", RFC 3748, June 2004. [Referred to herein as [RFC3748].

5. Johnson, D., Perkins, C., and J. Arkko, "Mobility Support in IPv6", RFC 3775, June 2004. Referred to herein as [RFC3775].

6. Malki, K., "Low latency Handoffs in Mobile IPv4", draft-ietf-mobileip-lowlatency-handoffs-v4-09 (work in progress), June 2004. Referred to herein as [I-D.ietf-mobileip-lowlatency-handoffs-v4]

7. Koodli, R., "Fast Handovers for Mobile IPv6", draft-ietf-mipshop-fast-mipv6-03 (work in progress), October 2004. Referred to herein as [I-D.ietf-mipshop-fast-mipv6].

8. Liebsch, M., "Candidate Access Router Discovery," draft-ietf-seamoby-card-protocol-08 (work in progress), September 2004. Referred to herein as [I-D.ietf-seamoby-card-protocol].

9. Loughney, J., "Context Transfer Protocol," draft-ietf-seamoby-ctp-11 (work in progress), August 2004. Referred to herein as [I-D.ietf-seamoby-ctp].

10. Aboba, B., "Extensible Authentication Protocol (EAP) Key Management Framework", draft-ietf-eap-keying-06 (work in progress), April 2005. Referred to herein as [I-D.ietf-eap-keying].

11. Forsberg, D., "Protocol for Carrying Authentication for Network Access (PANA)", draft-ietf-pana-pana-08 (work in progress), May 2005. Referred to herein as [I-D.ietf-pana-pana].

12. ITU-T, "General Characteristics of International Telephone Connections and International Telephone Circuits: One-Way Transmission Time", ITU-T Recommendation G.114 1998. Referred to herein as [RG98].

13. ITU-T, "The E-Model, a computational model for use in transmission planning", ITU-T Recommendation G.107 1998. Referred to herein as [ITU98].

14. ETSI, "Telecommunications and Internet Protocol Harmonization Over Networks (TIPHON) Release 3: End-to-end Quality of Service in TIPHON systems; Part 1: General Aspects of Quality of Service.", ETSI TR 101 329-6 V2.1.1. Referred to herein as [ETSI].

15. Kivinen, T. and H. Tschofenig, "Design of the MOBIKE protocol", draft-ietf-mobike-design-02 (work in progress), February 2005. Referred to herein as [I-D.ietf-mobike-design].

16. Moskowitz, R., "Host Identity Protocol", draft-ietf-hip-base-03 (work in progress), June 2005. Referred to herein as [I-D.ietf-hip-base]

17. Almes, G., Kalidindi, S., and M. Zekauskas, "A One-way Delay Metric for IPPM", RFC 2679, September 1999. Referred to herein as [RFC2679].

18. Almes, G., Kalidindi, S., and M. Zekauskas, "A One-way Packet Loss Metric for IPPM", RFC 2680, September 1999. Referred to herein as [RFC2680].

19. Almes, G., Kalidindi, S., and M. Zekauskas, "A Round-trip Delay Metric for IPPM", RFC 2681, September 1999. Referred to herein as [RFC2681].

20. Simpson, W., "IP in IP Tunneling", RFC 1853, October 1995. Referred to herein as [RFC1853].

21. Patrick, M., "DHCP Relay Agent Information Option", RFC 3046, January 2001. Referred to herein as [RFC3046].

22. Kim, P., Volz, B., and S. Park, "Rapid Commit Option for DHCPv4", draft-ietf-dhc-rapid-commit-opt-05 (work in progress), June 2004. Referred to herein as [I-D.ietf-dhc-rapid-commit-opt].

23. Ohba, Y., "Media-Independent Pre-Authentication (MPA) Implementation Results", draft-ohba-mobopts-mpa-implementation-00 (work in progress), June 2005. Referred to herein as [I-D.ohba-mobopts-mpa-implementation].

24. Schulzrine, H., "Application Layer Mobility Using SIP", MC2R. Referred to herein as [SIPMM].

25. Cambell, A., Gomez, J., Kim, S., Valko, A., and C. Wan, "Design, Implementation, and Evaluation of Cellular IP", IEEE Personal communication August 2000. Referred to herein as [CELLIP].

26. Ramjee, R., Porta, T., Thuel, S., Varadhan, K., and S. Wang, "HAWAII: A Domain-based Approach for Supporting Mobility in Wide-area Wireless networks", International Conference on Network Protocols ICNP'99. Referred to herein as [HAWAII].

27. Das, S., Dutta, A., Misra, A., and S. Das, "IDMP: An Intra-Domain Mobility Management Protocol for Next Generation Wireless Networks", IEEE Wireless Communication Magazine October 2000. Referred to herein as [IDMP].

28. Calhoun, P., Montenegro, G., Perkins, C., and E. Gustafsson, "Mobile IPv4 Regional Registration", draft-ietf-mobileip-reg-tunnel-09 (work in progress), July 2004. Referred to herein as [I-D.ietf-mobileip-reg-tunnel].

29. Yokota, H., Idoue, A., and T. Hasegawa, "Link Layer Assisted Mobile IP Fast Handoff Method over Wireless LAN Networks", Proceedings of ACM Mobicom 2002. Referred to herein as [YOKOTA].

30. Shin, S., "Reducing MAC Layer Handoff Latency in IEEE 802.11 Wireless LANs", MOBIWAC Workshop. Referred to herein as [MACD].

31. Dutta, A., Zhang, T., Madhani, S., Taniuchi, K., Ohba, Y., and H. Schulzrinne, "Secured Universal Mobility", WMASH 2004. Referred to herein as [SUM].

32. Dutta, A., Madhani, S., and H. Schulzrinne, "Fast handoff Schemes for Application Layer Mobility Management", PIMRC 2004. Referred to herein as [SIPFAST].

33. Gwon, Y., Fu, G., and R. Jain, "Fast Handoffs in Wireless LAN Networks using Mobile initiated Tunneling Handoff Protocol for IPv4 (MITHv4)", Wireless Communications and Networking 2003, January 2005. Referred to herein as [MITH].

34. Anjum, F., Das, S., Dutta, A., Fajardo, V., Madhani, S., Ohba, Y., Taniuchi, K., Yaqub, R., and T. Zhang, "A proposal for MIH function and Information Service", A contribution to IEEE 802.21 WG, January 2005. Referred to herein as [NETDISC].

35. "IEEE Wireless LAN Edition A compilation based on IEEE Std 802.11-1999(R2003)", Institute of Electrical and Electronics Engineers September 2003. Referred to herein as [802.11].

36. Dutta, A., "GPS-IP based fast-handoff for Mobiles", NYMAN 2003. Referred to herein as [GPSIP].

37. Vatn, J. and G. Maguire, "The effect of using co-located care-of-address on macro handover latency", 14th Nordic Teletraffic Seminar 1998. Referred to herein as [MAGUIRE].

SUMMARY OF THE INVENTION

The present invention improves upon the above and/or other background technologies and/or problems therein.

A method for controlling a handoff decision related to switch back of a mobile node between a first network and a second network in a media independent pre-authentication framework, comprising: a) providing the mobile node with a location determination module that is configured to provide a location determination in relation to access points in neighboring networks; b) based at least in part on an output of said location determination module, using a location-based algorithm to avoid oscillation between said first and second networks.

In some examples, the method further includes wherein said location-based algorithm is based at least in part on a correlation between a mobile node's location and cached data in relation to prior handover activities of the mobile node. In some examples, the method further includes wherein said cashed data is stored within digital data storage on said mobile node. In some examples, the method further includes wherein said location-based algorithm includes providing for switching to the other of said first network and said second network based on data related to past instances in which said mobile node switched to said other of said first network and said second network. In some examples, the method further includes that said location-based algorithm includes providing for not switching to the other of said first network and said second network based on data related to past instances in which said mobile node did not switch to said other of said first network and said second network. In some examples, the method further includes that said location determination module includes a GPS receiver. In some examples, the method further includes using a location-based algorithm to avoid oscillation between said first and second networks includes having said algorithm based at least in part on at least one non-location indicator. In some examples, said at least one non-location indicator includes an indicator of signal-to-noise ratio. In some examples, the method includes said first network is for a first media and said second network is for a different media, wherein either said first-media is cellular and said different-media is wireless LAN or said first-media is wireless LAN and said different-media is cellular.

According to some other embodiments, a method for mitigating effects of undesired switch back of a mobile node between a first network and a second network in a media independent pre-authentication framework includes: a) maintaining contexts related to a first network for a period of time such that the contexts can be quickly recovered when the mobile returns to the first network; b) having said mobile node use said contexts upon returning to said first network. In some examples, the method further includes wherein said contexts are stored in digital data storage on said mobile node and include data related to security associations, IP addresses, or tunnels established. In some examples, said first network is for a first media and said second network is for a different media, wherein either said first-media is cellular and said different-media is wireless LAN or said first-media is wireless LAN and said different-media is cellular.

According to some other embodiments, a method for mitigating effects of undesired switch back of a mobile node between a previous network and a new network in a media independent pre-authentication framework includes: transmitting data packets to both said previous network and said new network for a period of time so as to avoid loss of packets if the mobile node moves back to said previous network from said new network. In some examples, said step of transmitting data packets includes bicasting said data packets. In some examples, said previous network is for a first media and said new network is for a different media, wherein either said first-media is cellular and said different-media is wireless LAN or said first-media is wireless LAN and said different-media is cellular.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DISCUSSION OF THE PREFERRED EMBODIMENTS

Figure 1:
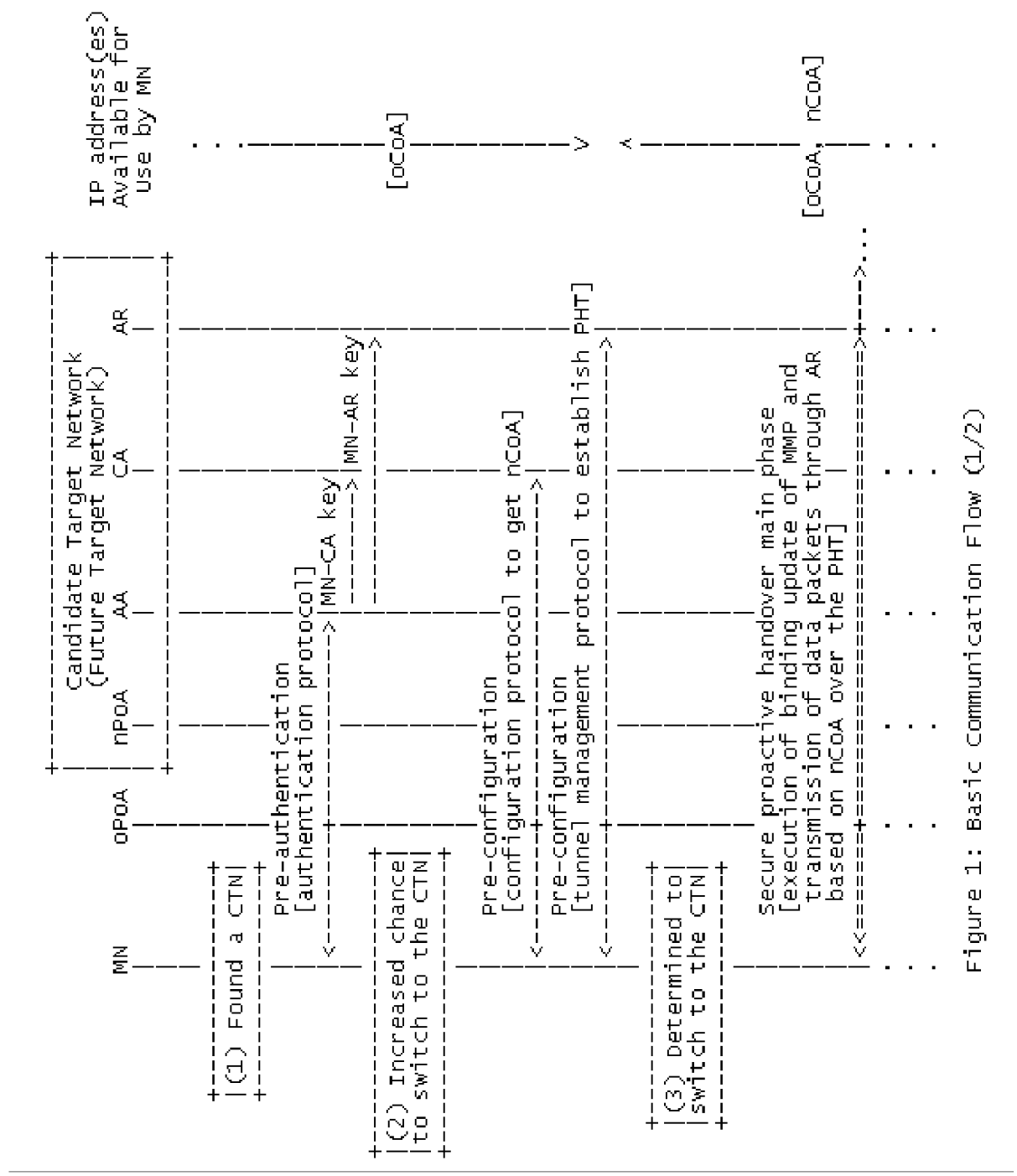
FIG. 1 is flow diagram depicting a basic communication flow according to some illustrative embodiments, which flow diagram is continued in FIG. 2.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

DETAILED DISCUSSION

In order to provide an optimized handover for a mobile experiencing rapid subnet and domain handover, we address several issues. These issues include discovery of neighboring networking elements, choosing the right network to connect to based on certain policy, changing the layer 2 point of attachment, obtaining an IP address from a DHCP or PPP server, confirming the uniqueness of the IP address, pre-authenticating with the authentication agent such as, e.g., an AAA server in a specific domain, sending the binding update to a correspondent host and obtaining the redirected streaming traffic to a new point of attachment, ping-pong effects, and the probability of moving to more than one network. These issues and methods for addressing or optimizing these in, e.g., the context of a MPA-based secure proactive handover are discussed below.

1. Discovery

Discovery of neighboring networking elements such as access points, access routers, authentication servers help expedite the handover process during a mobile's rapid movement between networks. By discovering the network neighborhood with a desired set of coordinates, capabilities and parameters the mobile can perform many of the operation such as pre-authentication, proactive IP address acquisition, proactive address resolution, and binding update while in the previous network.

There are several ways a mobile can discover the neighboring networks. The Candidate Access Router Discovery protocol (see reference [I-D.ietf-seamoby-card-protocol] above) helps discover the candidate access routers in the neighboring networks. Given a certain network domain Service Location Protocol (SLP) and Domain Name Services (DNS) help provide addresses of the networking components for a given set of services in the specific domain. In some cases many of the network layer and upper layer parameters may be sent over link-layer management frames such as beacons when the mobile approaches the vicinity of the neighboring networks. IEEE 802.11u is considering issues such as discovering neighborhood using information contained in link-layer. However, if the link-layer management frames are encrypted by some link-layer security mechanism, then the mobile node may not able to obtain the requisite information before establishing link-layer connectivity to the access point. In addition, this may add burden to the bandwidth constrained wireless medium. In such cases, a higher layer protocol is preferred to obtain the information regarding the neighboring elements. There is some proposal such as in the above reference [NETDISC] that helps obtain these information about the neighboring networks from a mobility server. When the mobile's movement is imminent, it starts the discovery process by querying a specific server and obtains the required parameters such as the IP address of the access point, its characteristics, routers, SIP servers or authentication servers of the neighboring networks. In the event of multiple networks, it may obtain the required parameters from more than one neighboring networks and keep these in cache. At some point, the mobile finds out several CTN's out of many probable networks and starts the pre-authentication process by communicating with the required entities in the CTN's. Further details of this scenario are set forth in the following Section 2.

2. Pre-Authentication in Multiple CTN Environment

In some cases, although a mobile decides a specific network to be the target network, it may actually end up moving into a neighboring network other than the target network due to factors that are beyond the mobile's control. Thus, it may be useful to perform the pre-authentication with a few probable candidate target networks and establish time-bound tunnels with the respective target routers in those networks. Thus, in the event of a mobile not moving to the target network as determined before, it will not be subjected to packet loss due to post-authentication and IP address acquisition delay since it ends up moving to a different target network. It may appear that by pre-authenticating with a number of candidate target networks and reserving the IP addresses, the mobile is provisioning the resources that could be used otherwise. But, since this happens for a time-limited period it should not be a big problem. The Mobile uses pre-authentication procedure to obtain an IP address proactively and set up the time bound tunnels with the target access routers.

In a normal scenario, the mobile assigns the new IP address to the virtual interface. But in case of obtaining multiple IP addresses from the neighboring networks, it can do two things. Either it can create one virtual interface with the IP address from the network where the mobile has decided to go or it can create multiple virtual interfaces using the respective IP addresses obtained from the neighboring networks. Mobile may choose one of these addresses as the binding update address and send it to the correspondent host (CH), and will thus receive the tunneled traffic via the target network while in the previous network. But, in some instances, the mobile may end up moving to a network that is other than the target network. Thus, there will be a disruption in traffic as the mobile moves to the new network since the mobile has to go through the process of assigning the new IP address and sending the binding update again. Two solutions can be proposed to take care of this problem. A mobile can take advantage of the simultaneous mobility binding and send multiple binding updates to the corresponding host. Thus, the corresponding host sends traffic to multiple IP addresses assigned to the virtual interfaces for a specific period of time. This binding update gets refreshed at the CH after the mobile moves to the new network, thus stopping the flow to the other candidate networks. In case simultaneous binding is not supported in a specific mobility scheme, forwarding of traffic from the previous target network will help take care of the transient traffic until the new binding update goes from the new network.

3. Proactive IP Address Acquisition

In general a mobility management protocol works in conjunction with Foreign Agent (FA) or in co-located address mode. Our MPA approach can use both co-located address mode and foreign agent address mode. We discuss here the address assignment component that is used in co-located address mode. There are several ways a mobile node can obtain an IP address and configure itself. Most commonly, a mobile can configure itself statically in the absence of any configuring element such as a server or router in the network. The IETF Zeroconf working group defines auto-IP mechanism where a mobile is configured in an ad-hoc manner and picks a unique address from a specified range such as 169.254.x.x. In a LAN environment, the mobile can obtain IP address from dynamic host configuration protocol (DHCP) servers. In case of IPv6 networks, a mobile has the option of obtaining the IP address using stateless auto-configuration or DHCPv6. In a wide area networking environment, mobile uses PPP to obtain the IP address by communicating with a network access server (NAS).

Each of these processes takes of the order of few hundred milliseconds to few seconds depending upon the type of IP address acquisition process and operating system of the clients and servers.

Since IP address acquisition is part of the handover process, it adds to the handover delay and thus it is desirable to reduce this timing as much as possible. There are few optimized techniques such as, e.g., DHCP Rapid Commit (see, e.g., reference [I-D.ieff-dhc-rapid-commit-opt] above) and GPS-coordinate based IP address (see, e.g., reference [GP-SIP] above) available that attempt to reduce the handover time due to IP address acquisition time. However in all these cases the mobile also obtains the IP address after it moves to the new subnet and incurs some delay because of the signaling handshake between the mobile node and the DHCP server.

In the following paragraph, we describe a number of ways a mobile node can obtain the IP address proactively from the CTN and the associated tunnel setup procedure. These can broadly be defined into four categories such as PANA-assisted proactive IP address acquisition, IKE-assisted proactive IP address acquisition, proactive IP address acquisition using DHCP only and stateless auto-configuration.

3.1 PANA-Assisted Proactive IP Address Acquisition

In case of PANA-assisted proactive IP address acquisition, the mobile node obtains an IP address proactively from a CTN. The mobile node makes use of PANA messages to trigger the address acquisition process on the DHCP relay agent that co-locates with PANA authentication agent in the access router in the CTN. Upon receiving a PANA message from the mobile node, the DHCP relay agent performs normal DHCP message exchanges to obtain the IP address from the DHCP server in the CTN. This address is piggy-backed in a PANA message and delivered to the client. In case of MIPv6 with stateless auto-configuration, the router advertisement from the new target network is passed to the client as part of PANA message. Mobile uses this prefix and MAC address to construct the unique IPv6 address as it would have done in the new network. Mobile IPv6 in stateful mode works very similar to DHCPv4.

3.2 IKEv2-Assisted Proactive IP Address Acquisition

IKEv2-assisted proactive IP address acquisition works when an IPsec gateway and a DHCP relay agent are resident within each access router in the CTN. In this case, the IPsec gateway and DHCP relay agent in a CTN help the mobile node acquire the IP address from the DHCP server in the CTN. The MN-AR key established during the pre-authentication phase is used as the IKEv2 pre-shared secret needed to run IKEv2 between the mobile node and the access router. The IP address from the CTN is obtained as part of standard IKEv2 procedure, with using the co-located DHCP relay agent for obtaining the IP address from the DHCP server in the target network using standard DHCP. The obtained IP address is sent back to the client in the IKEv2 Configuration Payload exchange. In this case, IKEv2 is also used as the tunnel management protocol for a proactive handover tunnel (see Section 5 below).

3.3 Proactive IP Address Acquisition Using DHCP Alone

As another alternative, DHCP may be used for proactively obtaining an IP address from a CTN without relying on PANA or IKEv2-based approaches by allowing direct DHCP communication between the mobile node and the DHCP relay or DHCP server in the CTN. In this case, the mobile node sends a unicast DHCP message to the DHCP relay agent or DHCP server in the CTN requesting an address, while using the address associated with the current physical interface as the source address of the request.

When the message is sent to the DHCP relay agent, the DHCP relay agent relays the DHCP messages back and forth between the mobile node and the DHCP server. In the absence of a DHCP relay agent the mobile can also directly communicate with the DHCP server in the target network. The broadcast option in client's unicast DISCOVER message should be set to 0 so that the relay agent or the DHCP server can send back the reply directly to the mobile using the mobile node's source address. This mechanism works as well for an IPv6 node using stateful configuration.

In order to prevent malicious nodes from obtaining an IP address from the DHCP server, DHCP authentication should be used or the access router should install a filter to block unicast DHCP message sent to the remote DHCP server from mobile nodes that are not pre-authenticated. When DHCP authentication is used, the DHCP authentication key may be derived from the MPA-SA established between the mobile node and the authentication agent in the candidate target network.

The proactively obtained IP address is not assigned to the mobile node's physical interface until the mobile has not moved to the new network. The IP address thus obtained proactively from the target network should not be assigned to the physical interface but rather to a virtual interface of the client. Thus such a proactively acquired IP address via direct DHCP communication between the mobile node and the DHCP relay or the DHCP server in the CTN may be carried with additional information that is used to distinguish it from other address assigned to the physical interface.

3.4 Proactive IP Address Acquisition Using Stateless Auto-Configuration

In case of IPv6, network address configuration is done either using DHCPv6 or stateless auto-configuration. In order to obtain the new IP address proactively, the router advertisement of the next hop router can be sent over the established tunnel, and a new IP6 address is generated based on the prefix and MAC address of the mobile. This address is assigned to the virtual address of the client and is sent as a binding update to the home agent or correspondent node. This router advertisement which is usually sent on a scoped multicast address can easily be tunneled to the mobile's oCOA. This will avoid the time needed to obtain an IP address and perform the Duplicate Address Detection.

Upon the mobile's entry to the new network, the mobile node can perform DHCP over the physical interface to the new network to get other configuration parameters such as SIP server, DNS server, etc., by using e.g., DHCP INFORM. This should not affect the ongoing communication between the mobile and correspondent host. Also, the mobile node can perform DHCP over the physical interface to the new network to extend the lease of the address that was proactively obtained before entering the new network.

In order to maintain the DHCP binding for the mobile node and keep track of the dispensed IP address before and after the secure proactive handover, the same DHCP client identifier needs to be used for the mobile node for both DHCP for proactive IP address acquisition and DHCP performed after the mobile node enters the target network. The DHCP client identifier may be the MAC address of the mobile node or some other identifier. In case of stateless auto-configuration, the mobile checks to see the prefix of the router advertisement in the new network and matches it with the prefix of newly assigned IP address. If these turn out to be the same then the mobile does not go through the IP address acquisition phase again.

4. Address Resolution Issues

4.1 Proactive Duplicate Address Detection

When the DHCP server dispenses an IP address, it updates its lease table, so that this same address is not given to another client for that specific period of time. At the same time the client also keeps a lease table locally so that it can renew when needed. In some cases, where a network consists of both DHCP and non-DHCP enabled clients, there is a probability that another client with the LAN may have been configured with an IP address from the DHCP address pool.

In such scenario the server does a duplicate address detection based on ARP (Address Resolution Protocol) or IPv6 Neighbor Discovery before assigning the IP address. This detection procedure may take up to 4 sec to 15 sec (see, e.g., reference [MAGUIRE] below) and will thus contribute to a larger handover delay. In case of proactive IP address acquisition process, this detection is performed ahead of time and thus does not affect the handover delay at all. By performing the duplicate address detection ahead of time, we reduce the handover delay factor.

4.2 Proactive Address Resolution Update

During the process of pre-configuration, the address resolution mappings needed by the mobile node to communicate with nodes in the target network after attaching to the target network can also be known, where the nodes may be the access router, authentication agent, configuration agent and correspondent node. There are a number of ways of performing such proactive address resolution.

1. Use an information service mechanism (see, e.g., reference [NETDISC] above) to resolve the MAC addresses of the nodes. This might require each node in the target network to involve in the information service so that the server of the information service can construct the database of proactive address resolution.

2. Extend the authentication protocol used for pre-authentication or the configuration protocol used for pre-configuration to support proactive address resolution. For example, if PANA is used as the authentication protocol for pre-authentication, PANA messages may carry AVPs used for proactive address resolution. In this case, the PANA authentication agent in the target network may perform address resolution for on behalf of the mobile node.

3. One can also make use of DNS to map the MAC address of the specific interface associated with a specific IP address of the network element in the target network. One may define a new DNS resource record (RR) to proactively resolve the MAC addresses of the nodes in the target network. But this approach may have its own limitations since a MAC address is a resource that is bound to an IP address, not directly to a domain name.

When the mobile node attaches to the target network, it installs the proactively obtained address resolution mappings without necessarily performing address resolution query for the nodes in the target network.

On the other hand, the nodes that reside in the target network and are communicating with the mobile node should also update their address resolution mappings for the mobile node as soon as the mobile node attaches to the target network. The above proactive address resolution methods could also be used for those nodes to proactively resolve the MAC address of the mobile node before the mobile node attaches to the target network. However, this is not useful since those nodes need to detect the attachment of the mobile node to the target network before adopting the proactively resolved address resolution mapping. A better approach would be integration of attachment detection and address resolution mapping update. This is based on gratuitously performing address resolution (see reference [RFC3344] and reference [RFC3775] above) in which the mobile node sends an Address Resolution Protocol (ARP) ARP Request or an ARP Reply in the case of IPv4 or a Neighbor Advertisement in the case of IPv6 immediately after the mobile node attaches to the new network so that the nodes in the target network can quickly update the address resolution mapping for the mobile node.

5. Tunnel Management

After an IP address is proactively acquired from the DHCP server in a CTN, a proactive handover tunnel is established between the mobile node and the access router in the CTN. The mobile node uses the acquired IP address as the tunnel inner address and most likely it assigns the address to a virtual interface.

The proactive handover tunnel is established using a tunnel management protocol. When IKEv2 is used for proactive IP address acquisition, IKEv2 is also used as the tunnel management protocol.

Alternatively, when PANA is used for proactive IP address acquisition, PANA may be used as the secure tunnel management protocol.

Once the proactive handover tunnel is established between the mobile node and the access router in the candidate target network, the access router also needs to perform proxy address resolution on behalf of the mobile node so that it can capture any packets destined to the mobile node's new address.

Since mobile needs to be able to communicate with the correspondent node while in the previous network some or all part of binding update and data from the correspondent node to mobile node need to be sent back to the mobile node over a proactive handover tunnel. When session initiation protocol (SIP) mobility is used for the mobility management protocol, the new address as the contact address is reported to the correspondent node using SIP Re-INVITE. Once the correspondent node's SIP user agent obtains the new contact address it sends the OK to the new contact address which actually belongs to the target network. The access router in the target network picks up the OK signal as it was directed to the new contact address and tunnels it to the mobile in its previous network. Final ACK message is received from the mobile to the correspondent node. Data from the mobile to the correspondent node may not need to be tunneled in the absence of ingress filtering. After completion of the SIP Re-INVITE signaling handshake, the data from the correspondent node is sent to mobile via the proactive handover tunnel.

In order for the traffic to be directed to the mobile node after the mobile node attaches to the target network, the proactive handover tunnel needs to be deleted or disabled. The tunnel management protocol used for establishing the tunnel is used for this purpose.

Alternatively, when PANA is used as the authentication protocol the tunnel deletion or disabling at the access router can be triggered by means of PANA update mechanism as soon as the mobile moves to the target network. A link-layer trigger ensures that the mobile node is indeed connected to the target network and can also be used as the trigger to delete or disable the tunnel.

6. Binding Update

There are several kinds of binding update mechanisms for different mobility management schemes. In some cases such as Mobile IPv4 without RO binding update is sent to the home agent (HA) only, binding update is sent both to the home agent and corresponding host in case of Mobile IPv6. In case of SIP-based terminal mobility, the mobile sends binding update using Re-INVITE to the correspondent node and REGISTER message to the Registrar. Based on the distance between the mobile and the correspondent node, the binding update may contribute to the handover delay. SIP-fast handover (see, e.g., [SIPFAST]) provides several ways of reducing the handover delay due to binding update. In case of secure proactive handover using SIP-based mobility management, we rule out the delay due to binding update completely, as it takes place in the previous network. Thus, this scheme looks more attractive when the correspondent node is too far from the communicating mobile node.

7. Preventing Packet Loss

In MPA cases, we did not observe any packet loss due to IP address acquisition, secured authentication and binding update. However, there may be some transient packets during link-layer handover that is directed to the mobile node before the mobile node is able to attach to the target network. Those transient packets can be lost.

Bicasting or buffering the transient packets at the access router can be used to minimize or eliminate packet loss. However, bicasting does not eliminate packet loss if link-layer handover is not seamlessly performed. On the other hand, buffering does not reduce packet delay. While packet delay can be compensated by playout buffer at the receiver side for streaming application, playout buffer does not help much for interactive VoIP application which cannot tolerate for large delay jitters. Thus, it is still important to optimize the link-layer handover anyway.

In addition, the MN may also ensure reachability to the new point of attachment before switching from the old one. This can be done by exchanging link-layer management frames with the new point of attachment. This reachability check should be performed as quick as possible. In order to prevent packet loss during this reachability check, transmission of packets over the link between the MN and old point of attachment should be suspended by buffering the packets at the both ends of the link during the reachability check. This buffering can be performed in a variety of ways, as would be appreciated based on this document.

8. Considerations for Failed Switching and Switch-Back

A Ping-Pong effect is one of the common problems found during a handover scenario. Such a Ping-Pong effect arises when a mobile is situated at the borderline of the cell or decision point and a handover procedure is frequently executed.

Among other things, this results in higher call drop probability, lower connection quality, increased signaling traffic and waste of resources. All of these affect mobility optimization. Handoff algorithms are the deciding factors for performing the handoff between the networks. Traditionally, these algorithms employ threshold to compare the values of different metrics to decide on the handoff. These metrics include signal strength, path loss, carrier-to-interference ratios (CIR), Signal to Interference Ratios (SIR), Bit Error Rate (BER), power budget, etc.

In order to avoid Ping-Pong effect some additional parameters are employed by the decision algorithm, such as hysteresis margin, dwell timers, and averaging window. For a high moving vehicle, other parameters such as distance between Mobile Host (MH) and the point of attachment, velocity of the mobile, location of the mobile, traffic and bandwidth characteristics are also taken into account to reduce the Ping-Pong effect.

Most recently, there are other handoff algorithms that help reduce the Ping-Pong effect in a heterogeneous network environment that are based on techniques such as hypothesis testing, dynamic programming and pattern recognition techniques. While it is important to implement handoff algorithms to reduce the Ping-Pong effect, it is also important to implement methods to recover from this effect.

In the case of MPA framework, Ping-Pong effect will result in the back-and-forth movement of the mobile between current network and target network and between the candidate target networks. MPA in its current form will be affected because of numerous tunnel setup, number of binding updates and associated handoff latency. Since Ping-Pong effect is related to handoff rate, it may also contribute to delay and packet loss.

In some embodiments, several algorithms are now set forth that can be performed to help reduce the probability of Ping-Pong. In addition, several methods for the MPA framework are also now set forth that it enable recovery from the packet loss resulting out of Ping-Pong effect.

In some embodiments, an MPA framework can take advantage of the mobile's geo-location with respect to APs in the neighboring networks using a global positioning system (GPS). In this regard, an illustrative GPS system includes a constellation of satellites that orbit the Earth and enable GPS receivers to pinpoint their geographic location. In order to avoid the oscillation between the networks, a location-based intelligent algorithm can be derived by using a co-relation between user's location and cached data from the previous handover attempts. In some cases only location may not be the only indicator for a handoff decision. For example, in Manhattan type networks, although a mobile is close to an AP, it may not have enough signal to noise ratio (SNR) to make a good connection. Thus, mobility pattern and path identification may help avoid the Ping-Pong effect.

In the absence of a good handoff algorithm that can avoid Ping-Pong effect, it may be required to put in place a good recovery mechanism so as to mitigate the effect of Ping-Pong. It may be necessary to keep the established context in the current network for a period of time, so that it can be quickly recovered when the mobile comes back to the network where the context was last used. These contexts may include security association, IP address used, tunnels established etc. Bicasting the data to both previous network and new network for a predefined period will also help take care of the lost packets in case the mobile moves back and forth between the networks. Mobile should be able to determine if it is in a stable state with respect to ping-pong situation.

9. Link-Layer Security and Mobility

Using the MPA-SA established between the mobile node and the authentication agent in a CTN, during the pre-authentication phase, it is possible to bootstrap link-layer security in the CTN while the mobile node is in the current network in the following way.

1. The authentication agent in the CTN and the mobile node derives a PMK (Pair-wise Master Key) (see reference [I-D.ietf-eap-keying] above) using the MPA-SA that is established as a result of successful pre-authentication. Executions of EAP and an AAA protocol may be involved during pre-authentication to establish the MPA-SA. From the PMK, distinct TSKs (Transient Session Keys) (see reference [I-D.ieff-eap-keying] above) for the mobile node are directly or indirectly derived for each point of attachment of the CTN.

2. The authentication agent may install the keys derived from the PMK and used for secure association to points of attachment. The derived keys may be TSKs or intermediary keys from which TSKs are derived.

3. After the mobile node chooses a CTN as the target network and switches to a point of attachment in the target network (which now becomes the new network for the mobile node), it executes a secure association protocol such as IEEE 802.11i 4-way handshake [802.11i] using the PMK in order to establish PTKs (Pair-wise Transient Keys) and GTKs (Group Transient Keys) (see reference [I-D.ietf-eap-keying] above) used for protecting link-layer packets between the mobile node and the point of attachment. No additional execution of EAP authentication is needed here.

4. While the mobile node is roaming in the new network, the mobile node only needs to perform a secure association protocol with its point of attachment point and no additional execution of EAP authentication is needed either. Integration of MPA with link-layer handover optimization mechanisms such as 802.11r can be archived this way.

The mobile node may need to know the link-layer identities of the point of attachments in the CTN to derive TSKs. If PANA is used as the authentication protocol for pre-authentication, this is possible by carrying Device-Id AVPs in the PANA-Bind-Request message sent from the PAA (see reference [I-D.ieff-pana-pana] above), with each attribute value pair (AVP) containing the Basic Service Set Identifier (BSSID) of a distinct access point.

Figure 3:
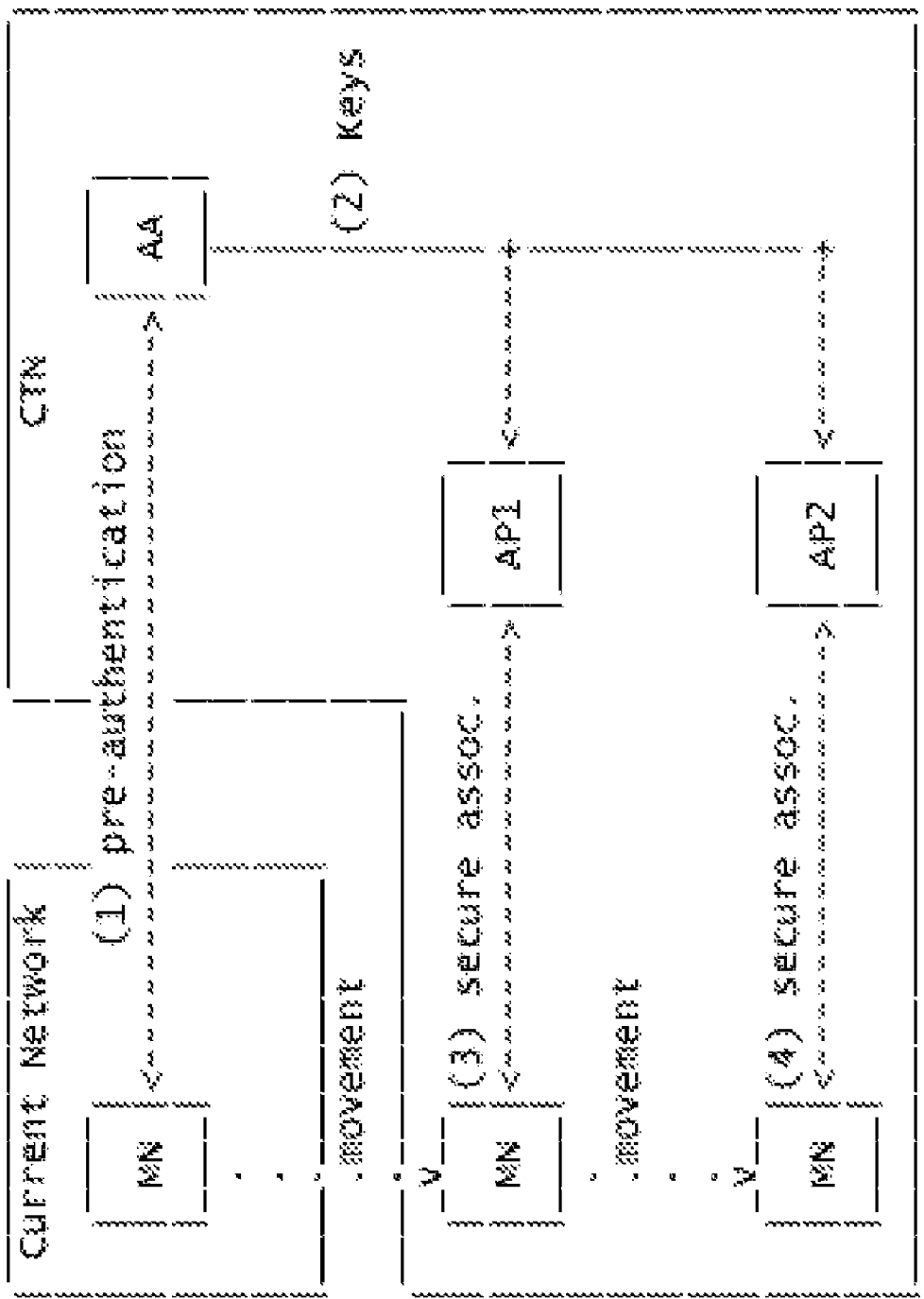
FIG. 3 is a diagram depicting the bootstrapping of link-layer security according to some illustrative embodiments.

With reference to FIG. 3, the figure diagrammatically depicts bootstrapping link-layer security according to some illustrative embodiments.

10. Authentication In Initial Network Attachment

When the mobile node initially attaches to a network, network access authentication would occur regardless of the use of MPA. The protocol used for network access authentication when MPA is used for handover optimization can be a link-layer network access authentication protocol such as IEEE 802.1X or a higher-layer network access authentication protocol such as PANA.

11. Security Considerations

This document describes a framework of a secure handover optimization mechanism based on performing handover-related signaling between a mobile node and one or more candidate target networks to which the mobile node may move in the future. This framework involves acquisition of the resources from the CTN as well as data packet redirection from the CTN to the mobile node in the current network before the mobile node physically connects to one of those CTN.

Acquisition of the resources from the candidate target networks must accompany with appropriate authentication and authorization procedures in order to prevent unauthorized mobile node from obtaining the resources. For this reason, it is important for the MPA framework to perform pre-authentication between the mobile node and the candidate target networks. The MN-CA key and the MN-AR key generated as a result of successful pre-authentication can protect subsequent handover signaling packets and data packets exchanged between the mobile node and the MPA functional elements in the CTN's.

The MPA framework also addresses security issues when the handover is performed across multiple administrative domains. With MPA, it is possible for handover signaling to be performed based on direct communication between the mobile node and routers or mobility agents in the candidate target networks. This eliminates the need for a context transfer protocol for which known limitations exist in terms of security (see reference [I-D.ietf-eap-keying] above). For this reason, the MPA framework does not require trust relationship among administrative domains or access routers, which makes the framework more deployable in the Internet without compromising the security in mobile environments.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for controlling a handoff decision related to switch back of a mobile node between a first network and a second network in a media independent pre-authentication framework, comprising:

a) providing the mobile node with a location determination module that is configured to provide a location determination in relation to access points in neighboring networks;

b) based at least in part on an output of said location determination module, using a location-based algorithm to avoid oscillation between said first and second networks, said location-based algorithm including determining past instances of mobile node switching between networks and determining a criteria for handoff based on said instances;

said pre-authentication framework including said mobile node pre-authenticating with said second network before said mobile node moves from said first network to said second network.

2. The method of claim 1, wherein said location-based algorithm is based at least in part on a correlation between a mobile node's location and cached data in relation to prior handover activities of the mobile node.

3. The method of claim 2, wherein said cashed data is stored within digital data storage on said mobile node.

4. The method of claim 2, wherein said location-based algorithm includes providing for switching to the other of said first network and said second network based on data related to past instances in which said mobile node switched to said other of said first network and said second network.

5. The method of claim 2, wherein said location-based algorithm includes providing for not switching to the other of said first network and said second network based on data related to past instances in which said mobile node did not switch to said other of said first network and said second network.

6. The method of claim 1, wherein said location determination module includes a GPS receiver.

7. The method of claim 1, wherein said using a location-based algorithm to avoid oscillation between said first and second networks includes having said algorithm based at least in part on at least one non-location indicator.

8. The method of claim 7, wherein said at least one non-location indicator includes an indicator of signal-to-noise ratio.

9. The method of claim 1, wherein said algorithm is performed via programming in said mobile node.

10. The method of claim 1, wherein said algorithm is performed at least in part via programming external to said mobile node.

11. The method of claim 1, further including performing pre-authentication using a link-layer agnostic network access authentication protocol between said mobile node and an authentication agent on the second network.

12. The method of claim 1, further including performing pre-authentication across multiple administrative domains.

13. The method of claim 1, wherein said first network is for a first media and said second network is for a different media, wherein either said first-media is cellular and said different-media is wireless LAN or said first-media is wireless LAN and said different-media is cellular.

14. The method of claim 2, further employing PANA as a network access authentication protocol.

15. A method for mitigating effects of undesired switch back of a mobile node between a first network and a second network in a media independent pre-authentication framework, comprising:

a) using a location-based algorithm to mitigate oscillation between said first and second networks, said location-based algorithm including determining past instances of mobile node switching between networks and determining a criteria for handoff based on said instances;
b) maintaining contexts related to a first network for a period of time such that the contexts can be quickly recovered when the mobile returns to the first network;
c) having said mobile node use said contexts upon returning to said first network;
   said pre-authentication framework including said mobile node pre-authenticating with said second network before said mobile node moves from said first network to said second network.

16. The method of claim 15, wherein said contexts are stored in digital data storage on said mobile node and include data related to security associations, IP addresses, or tunnels established.

17. The method of claim 15, wherein said first network is for a first media and said second network is for a different media, wherein either said first-media is cellular and said different-media is wireless LAN or said first-media is wireless LAN and said different-media is cellular.

18. A method for mitigating effects of undesired switch back of a mobile node between a previous network and a new network in a media independent pre-authentication framework, comprising: using a location-based algorithm to mitigate oscillation between said first and second networks, said location-based algorithm including determining past instances of mobile node switching between networks and determining a criteria for handoff based on said instances; and transmitting data packets to both said previous network and said new network for a period of time so as to avoid loss of packets if the mobile node moves back to said previous network from said new network, said pre-authentication framework including said mobile node pre-authenticating with said second network before said mobile node moves from said first network to said second network.

19. The method of claim 18, wherein said step of transmitting data packets includes bicasting said data packets.

20. The method of claim 18, wherein said previous network is for a first media and said new network is for a different media, wherein either said first-media is cellular and said different-media is wireless LAN or said first-media is wireless LAN and said different-media is cellular.

21. The method of claim 1, wherein said neighboring networks include two access networks that each belong to two different subnets or administrative domains in a pre-authentication environment.

22. The method of claim 21, where said mobile node makes a determination to avoid the ping-pong between said access networks free from external input from any route server in a wireless communication network.

23. The method of claim 1, wherein said first and second networks involve different types of access networks.

24. The method of claim 23, wherein said first and second networks involve cellular and wireless LAN networks.

* * * * *

UNITED STATES PATENT AND TRADEMARK OFFICE
CERTIFICATE OF CORRECTION

PATENT NO. : 7,738,882 B2  
APPLICATION NO. : 11/279856  
DATED : June 15, 2010  
INVENTOR(S) : Dutta et al.

Page 1 of 2

It is certified that error appears in the above-identified patent and that said Letters Patent is hereby corrected as shown below:

On the Title Page, in Item (73), under "ASSIGNEES", in Column 1, Line 2, delete "Piscataway;" and insert -- Piscataway, NJ (US); --, therefor.

On the Title Page, in Item (73), under "ASSIGNEES", in Column 1, Line 3, delete "Piscataway" and insert -- Piscataway, NJ (US) --, therefor.

On Title Page 2, in Item (56), under "OTHER PUBLICATIONS", in Column 2, Line 7, delete "Netowrks," and insert -- Networks, --, therefor.

In The Drawings

Figure 2:
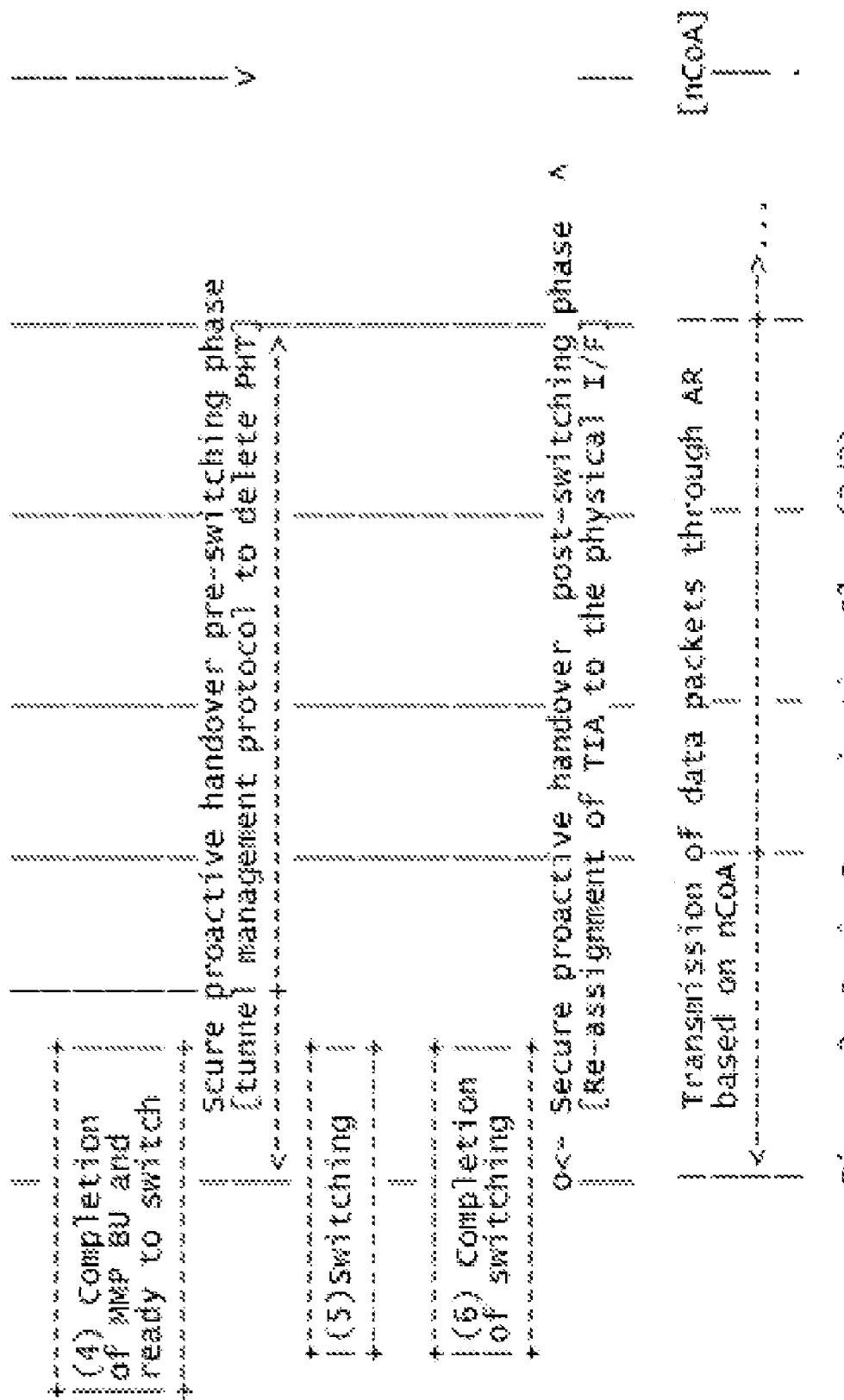
FIG. 2 is a continuation of the flow diagram shown in FIG. 1.

In Fig. 2, Sheet 2 of 4, Line 4, delete "Scure" and insert -- Secure --, therefor.

Figure 4:
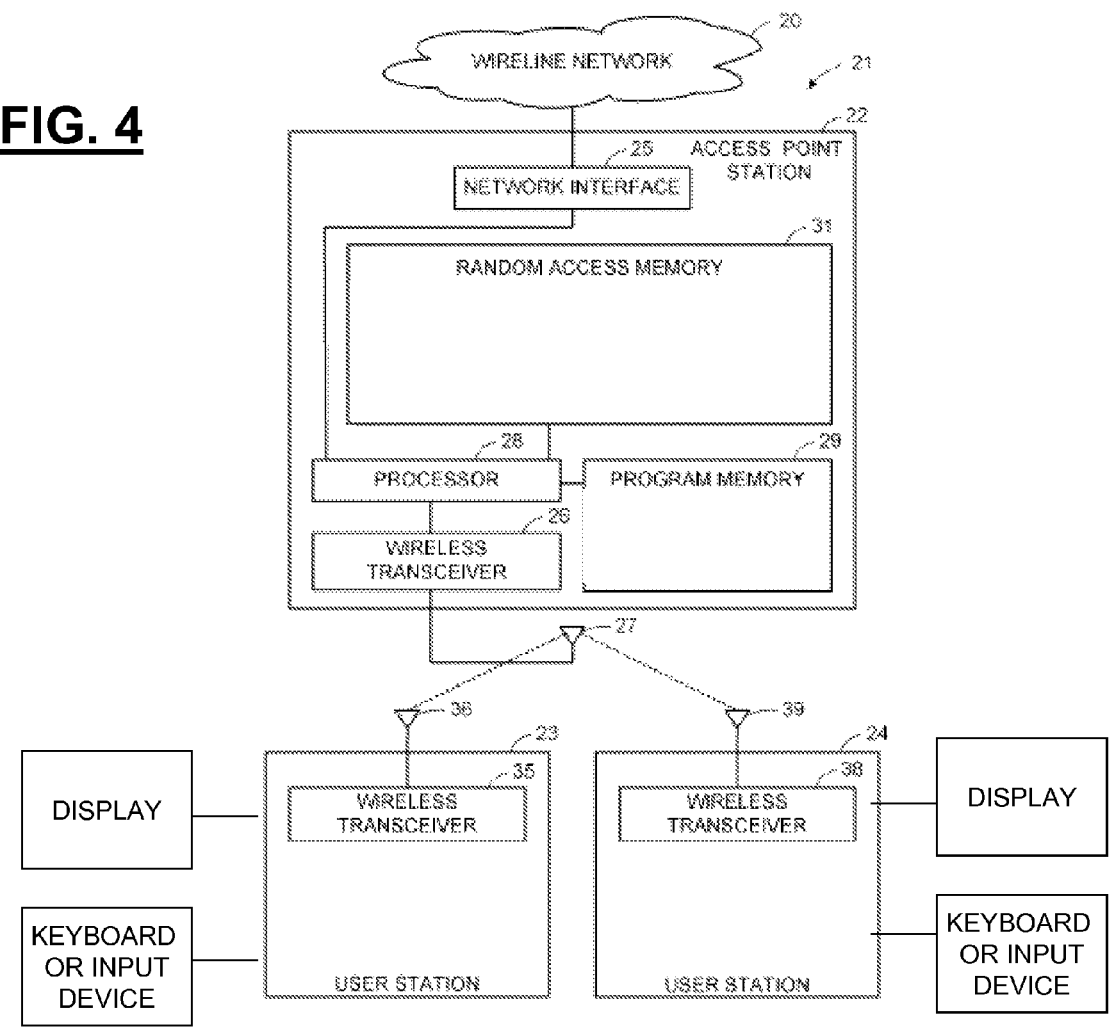
FIG. 4 is an architectural diagram showing exemplary sub-components of an illustrative access point and illustrative client devices or user stations according to some illustrative embodiments of the invention.

In Fig. 4, Sheet 4 of 4, delete "FIG. 4" and insert -- Figure 4 --, therefor.

In The Specification

In Column 1, Line 52, delete "from device" and insert -- from one device (e.g., a phone, a PDA [Personal Digital Assistant], a computer, etc) to another --, therefor.

In Column 3, Line 57, delete "Bluetooth respect" and insert -- Bluetooth IP address, a Bluetooth IP Common Name, an 802.11 IP Address, an 802.11 IP Common Name, or an IEEE MAC address. Wireless networks can also involve methods and protocols found in e.g., Mobile IP (Internet Protocol) systems, in PCS systems, and in other mobile network systems. With respect --, therefor.

In Column 5, Line 34, delete "-ieff-" and insert -- -ietf- --, therefor.

Signed and Sealed this  
Twenty-seventh Day of January, 2015

Michelle K. Lee  
*Deputy Director of the United States Patent and Trademark Office*

CERTIFICATE OF CORRECTION (continued)
U.S. Pat. No. 7,738,882 B2

In Column 6, Line 48, delete "Usaqe" and insert -- Usage --, therefor.

In Column 8, Line 46, delete "Multihorning)" and insert -- Multihoming) --, therefor.

In Column 8, Line 63, delete "[I-D.ieff-" and insert -- [I-D.ietf- --, therefor.

In Column 15, Line 4, delete "-handoffs-v4]" and insert -- -handoffs-v4].- --, therefor.

In Column 18, Line 9, delete "is" and insert -- is a- --, therefor.

In Column 20, Line 36, delete "[I-D.ieff-" and insert -- [I-D.ietf- --, therefor.

In Column 26, Lines 15-16, delete "[I-D.ieff-" and insert -- [I-D.ietf- --, therefor.

In Column 26, Line 43, delete "[I-D.ieff-" and insert -- [I-D.ietf- --, therefor.

In The Claims

In Column 30, Line 19, in Claim 22, delete "where" and insert -- wherein --, therefor.